United States Patent
Koyanagi

Patent Number: 6,078,865
Date of Patent: Jun. 20, 2000

[54] NAVIGATION SYSTEM FOR GUIDING A MOBILE UNIT THROUGH A ROUTE TO A DESTINATION USING LANDMARKS

[75] Inventor: Takuo Koyanagi, Tokyo, Japan

[73] Assignee: Xanavi Informatics Corporation, Japan

[21] Appl. No.: 08/951,790

[22] Filed: Oct. 16, 1997

[30] Foreign Application Priority Data

Oct. 17, 1996 [JP] Japan .................................. 8-274617

[51] Int. Cl.[7] .................................................. G09B 29/10
[52] U.S. Cl. .................... 701/211; 701/200; 701/207; 701/208; 701/209; 340/988; 340/990; 340/995; 364/443; 364/449.3
[58] Field of Search ................................... 701/200, 207, 701/208, 209, 211; 340/908, 990, 995; 364/443, 449.3

[56] References Cited

U.S. PATENT DOCUMENTS 4,761,742 8/1988 Hanabusa et al. ...................... 364/443

FOREIGN PATENT DOCUMENTS

| 0 673 010 A1 | 9/1995 | European Pat. Off. . |
| 0 703 435 A1 | 3/1996 | European Pat. Off. . |
| WO 94/27268 | 11/1994 | WIPO . |

Primary Examiner—William A. Cuchlinski, Jr.
Assistant Examiner—Olga Hernandez
Attorney, Agent, or Firm—Pennie & Edmonds LLP

[57] ABSTRACT

A navigation system which provides easy-to-understand route guidance using landmarks. Once a guided route is determined (201), the system determines the priority of landmarks to be used in route guidance considering such factors as an initial setting, time of day (daytime or nighttime), and user specifications (201), and selects crossings for which route guidance will be given (203). As a mobile unit approaches one of selected crossings (203, 206, 207), the system selects one of landmarks at the crossing and, at the same time, selects guidance phrases based on a relationship between the position of the landmark and running directions in which the mobile unit runs before and after passing through the crossing (209). Then, with the use of the landmark, the system provides guidance information on the running direction after passing through the crossing (210) using the selected phrase.

8 Claims, 11 Drawing Sheets

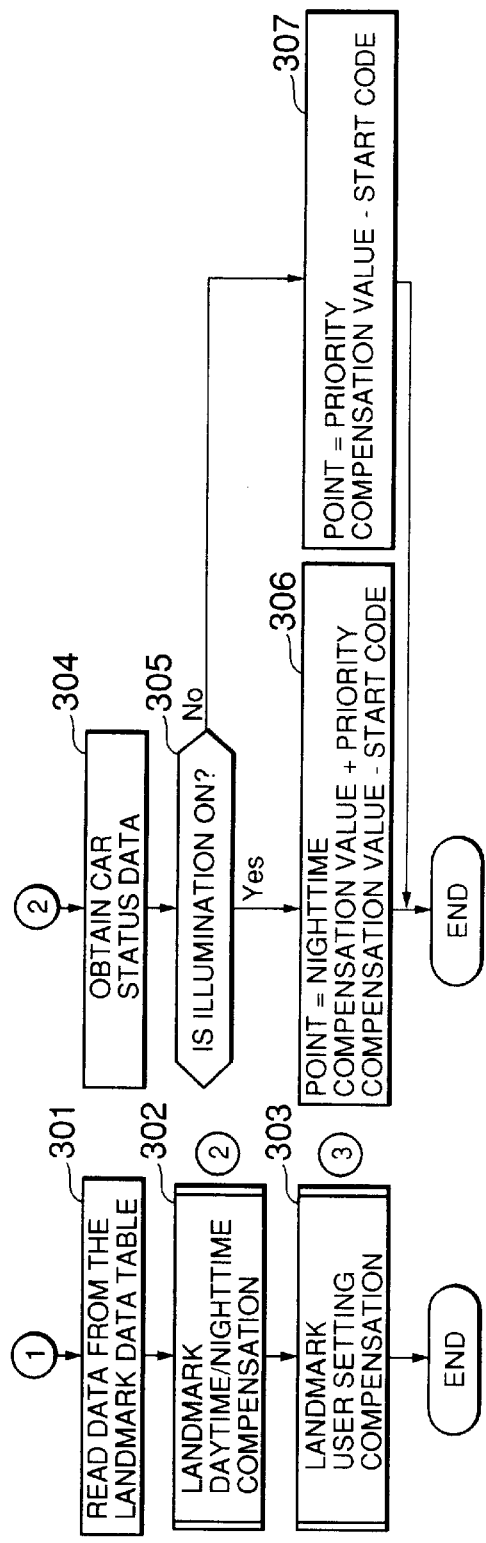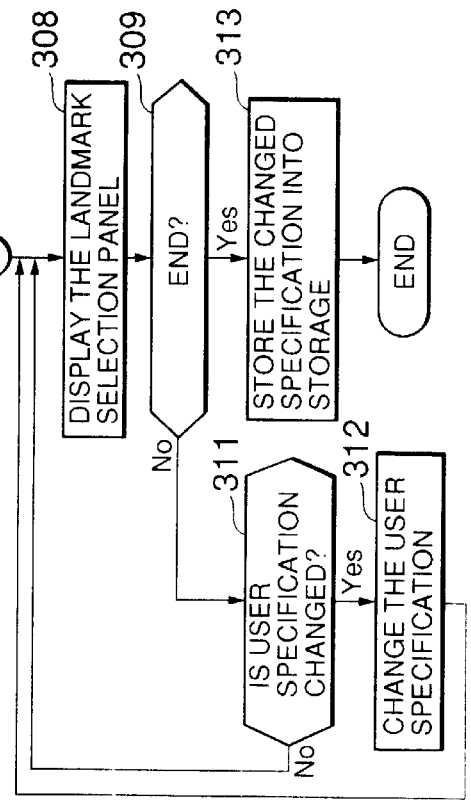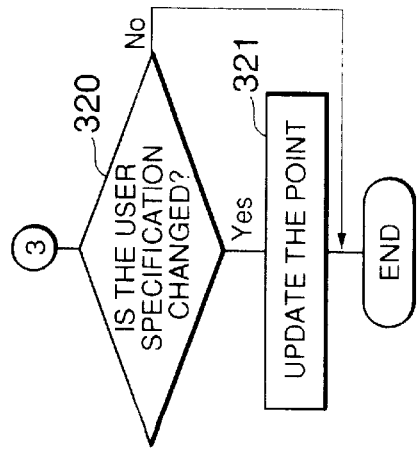

FIG.4

| BASIC PRIORITY | ITEM | START CODE | CODE RANGE | PRIORITY COMPENSATION VALUE | NIGHTTIME COMPENSATION VALUE | POINT |
|---|---|---|---|---|---|---|
| 1 | [GAS STATION] | 400 | 100 | 4400 | 3000 | |
| 2 | [CONVENIENCE STORE] | 800 | 100 | 4700 | 3000 | |
| 3 | [FAMILY RESTAURANT] | 900 | 100 | 4700 | 3000 | |
| 4 | [FAST FOOD RESTAURANT] | 700 | 100 | 4400 | | |
| 5 | [BANK] | 1800 | 100 | 5400 | | |
| 6 | [CAR DEALER] | 500 | 200 | 4000 | | |
| 7 | [PUBLIC FACILITIES] | 2100 | 100 | 5400 | | |
| 8 | [SCHOOL] | 1900 | 100 | 5100 | | |
| 9 | [HOSPITAL] | 2000 | 100 | 5100 | | |
| 10 | [CAR ACCESSORY SHOP] | 1550 | 50 | 4550 | | |
| 11 | [CAR-RENTAL AGENT] | 1600 | 100 | 4550 | 3000 | |
| 12 | [SUPER MARKET] | 1000 | 100 | 3850 | | |
| 13 | [DEPARTMENT STORE] | 1100 | 100 | 3850 | | |
| 14 | [GENERAL STORE] | 1500 | 50 | 4150 | | |
| 15 | [TAILOR] | 1400 | 100 | 4000 | | |
| 16 | [ELECTRICAL APPLIANCES STORE] | 1300 | 100 | 3800 | | |
| 17 | [SPORTS SHOP] | 1200 | 100 | 3600 | | |
| 18 | [WEDDING HALL] | 1700 | 100 | 4000 | | |
| 19 | [FORWARDING AGENT] | 2800 | 400 | 5000 | | |
| 20 | [STORE] | 2300 | 200 | 4100 | | |
| 21 | [COMMUNITY CENTER] | 2700 | 100 | 4300 | | |
| 22 | [COMPANY (PRIVATE)] | 2500 | 200 | 4000 | | |
| 23 | [BUILDING] | 2200 | 100 | 3500 | | |
| 24 | [ROAD FACILITIES] | 3200 | 300 | 4400 | 3000 | |

FIG.5

| BASIC PRIORITY | ITEM | USER SPECIFICATION |
|---|---|---|
| 1 | [GAS STATION] | ○ |
| 2 | [CONVENIENCE STORE] | ○ |
| 3 | [FAMILY RESTAURANT] | ○ |
| 4 | [FAST FOOD RESTAURANT] | |
| 5 | [BANK] | |
| 6 | [CAR DEALER] | ○ |
| 7 | [PUBLIC FACILITIES] | |
| 8 | [SCHOOL] | |
| 9 | [HOSPITAL] | |
| 10 | [CAR ACCESSORY SHOP] | |
| 11 | [CAR-RENTAL AGENT] | |
| 12 | [SUPER MARKET] | |
| 13 | [DEPARTMENT STORE] | |
| 14 | [GENERAL STORE] | |
| 15 | [TAILOR] | |
| 16 | [ELECTRICAL APPLIANCES STORE] | ○ |
| 17 | [SPORTS SHOP] | |
| 18 | [WEDDING HALL] | |
| 19 | [FORWARDING AGENT] | |
| 20 | [STORE] | |
| 21 | [COMMUNITY CENTER] | |
| 22 | [COMPANY (PRIVATE)] | ○ |
| 23 | [BUILDING] | ○ |
| 24 | [ROAD FACILITIES] | ○ |

( END )

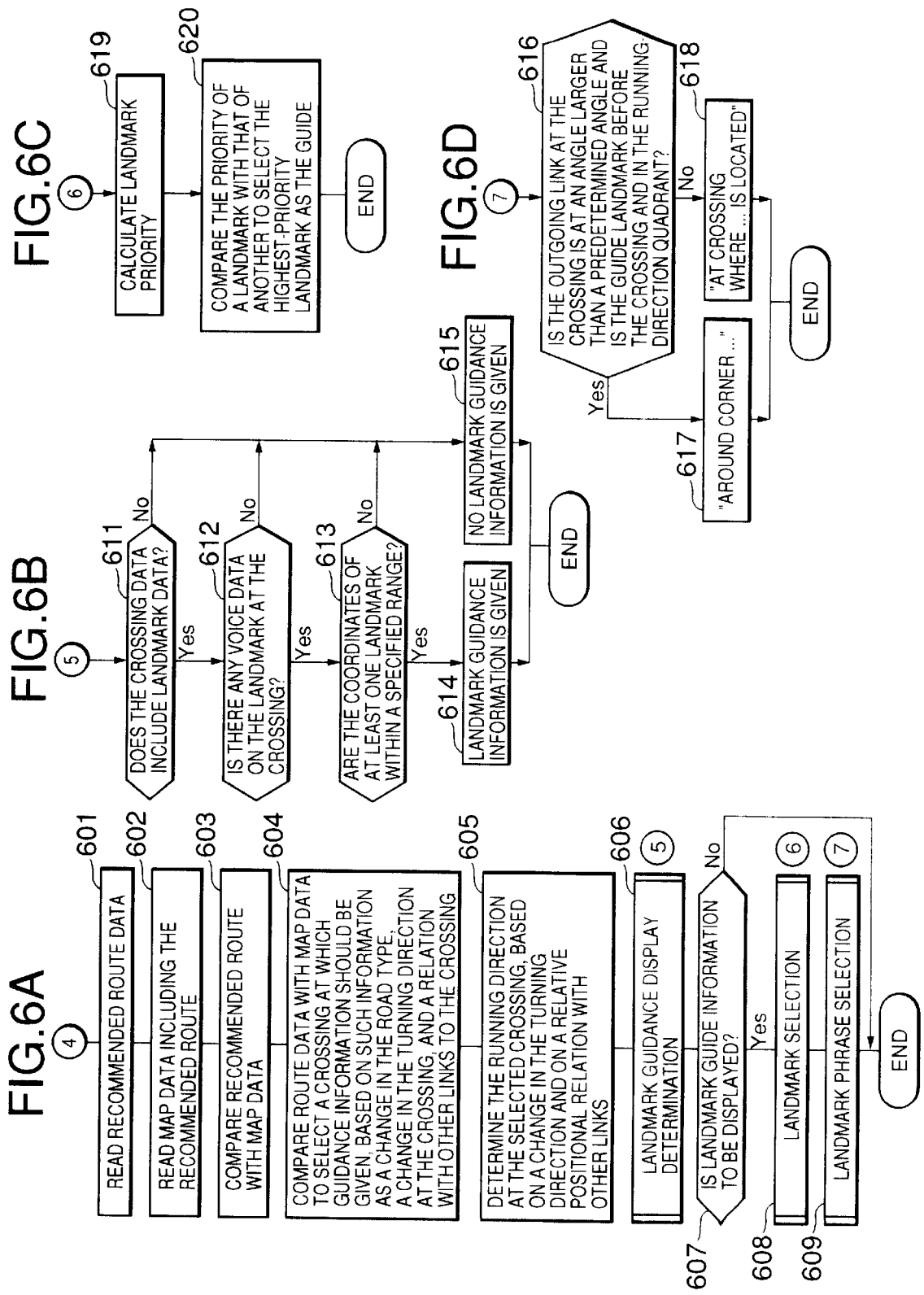

FIG.7

| | |
|---|---|
| X COORDINATE OF CROSSING N | 500 |
| Y COORDINATE OF CROSSING N | 700 |
| NO. OF LANDMARKS | 3 |
| TYPE ID OF LANDMARK 1 | 400 |
| X COORDINATE OF LANDMARK 1 | -20 |
| Y COORDINATE OF LANDMARK 1 | 10 |
| TYPE ID OF LANDMARK 2 | 2300 |
| X COORDINATE OF LANDMARK 2 | 20 |
| Y COORDINATE OF LANDMARK 2 | -10 |
| TYPE ID OF LANDMARK 3 | 800 |
| X COORDINATE OF LANDMARK 3 | -10 |
| Y COORDINATE OF LANDMARK 3 | -20 |

FIG.8

| ID | VOICE PHRASE |
|---|---|
| 1 | SHORTLY |
| 2 | 300 M AHEAD |
| 3 | 500 M AHEAD |
| 4 | 700 M AHEAD |
| 5 | 1 km AHEAD |
| 6 | 2 km AHEAD |
| 7 | RIGHT |
| 8 | STRAIGHT |
| 9 | LEFT |
| 10 | AT CROSSING WHERE ... IS LOCATED |
| 11 | AROUND CORNER |
| : | : |
| : | : |

| | |
|---|---|
| : | : |
| : | : |
| 400 | GAS STATION |
| : | : |
| 500 | CAR DEALER |
| : | : |
| : | : |
| 700 | FAST FOOD RESTAURANT |
| : | : |
| 800 | CONVENIENCE STORE |
| : | : |
| 900 | FAMILY RESTAURANT |
| : | : |
| 1000 | SUPER MARKET |
| 1100 | DEPARTMENT STORE |
| : | : |
| : | : |
| 1600 | CAR-RENTAL AGENT |
| : | : |
| : | : |
| : | : |
| | |

NAVIGATION SYSTEM FOR GUIDING A MOBILE UNIT THROUGH A ROUTE TO A DESTINATION USING LANDMARKS

BACKGROUND OF THE INVENTION

1. Field of the Invention

This invention relates to a navigation system which guides mobile units, such as a car, through a desired route.

2. Description of Related Art

An earlier patent disclosure dealing with a navigation system which guides a car driver to a destination is found, for example, in Japanese Patent Laid-Open Application No. Hei 7-63571. According to the disclosed technology, information on turning right or left at a crossing, along with information on the types and names of the buildings at the crossing, is given using spoken words and displays before the car enters the crossing,

SUMMARY OF THE INVENTION

For a navigation system which gives information on turning right or left at a crossing, along with information on the types and names of the buildings at the crossing, which building at the crossing is to be used as a guide and what expression is to be used for spoken words are important for an easy-to-understand guide.

Accordingly, it is an object of the present invention to provide a navigation system which gives guidance information which enables a driver to understand turning directions and points easily.

To achieve the above object, a navigation system according to the present invention is a navigation system which guides a mobile unit through a route to a destination, comprising:

a road map database containing data on a road map and data on landmarks at each crossing in the road map;

a landmark table describing the priority of each type of landmark; and guidance means for selecting the landmark of highest-priority type from a plurality of landmarks at the crossing which the mobile unit is going to enter, based on the road map database and the landmark table, the crossing being on the route to the destination, and for providing guidance information referencing the landmark and indicating the route along which the mobile unit should run.

In should be noted that the suitability of a landmark as a guide (road guide) depends primarily on the type of landmark. For example, a station or a police stand is always suitable as a landmark. Therefore, defining priority for each type of landmark and giving route guidance at each crossing according to the defined priority efficiently provides easy-to-understand route guidance where suitable landmarks are used.

BRIEF DESCRIPTION OF THE DRAWINGS

FIG. 3A is a flowchart showing a processing procedure for the navigation system.

FIG. 3B is a flowchart showing a processing procedure for the navigation system.

FIG. 3C is a flowchart showing a processing procedure for the navigation system.

FIG. 3D is a flowchart showing a processing procedure for the navigation system.

FIG. 4 is a diagram showing the configuration of a landmark data table.

FIG. 5 is a diagram showing a landmark selection panel.

FIG. 6A is a flowchart showing a processing procedure for the navigation system.

FIG. 6B is a flowchart showing a processing procedure for the navigation system.

FIG. 6C is a flowchart showing a processing procedure for the navigation system.

FIG. 6D is a flowchart showing a processing procedure for the navigation system.

FIG. 7 is a diagram showing the configuration of crossing data.

FIG. 8 is a diagram showing the configuration of voice data groups.

DESCRIPTION OF PREFERRED EMBODIMENTS

An embodiment of a navigation system according to the present invention is described below.

Figure 1:
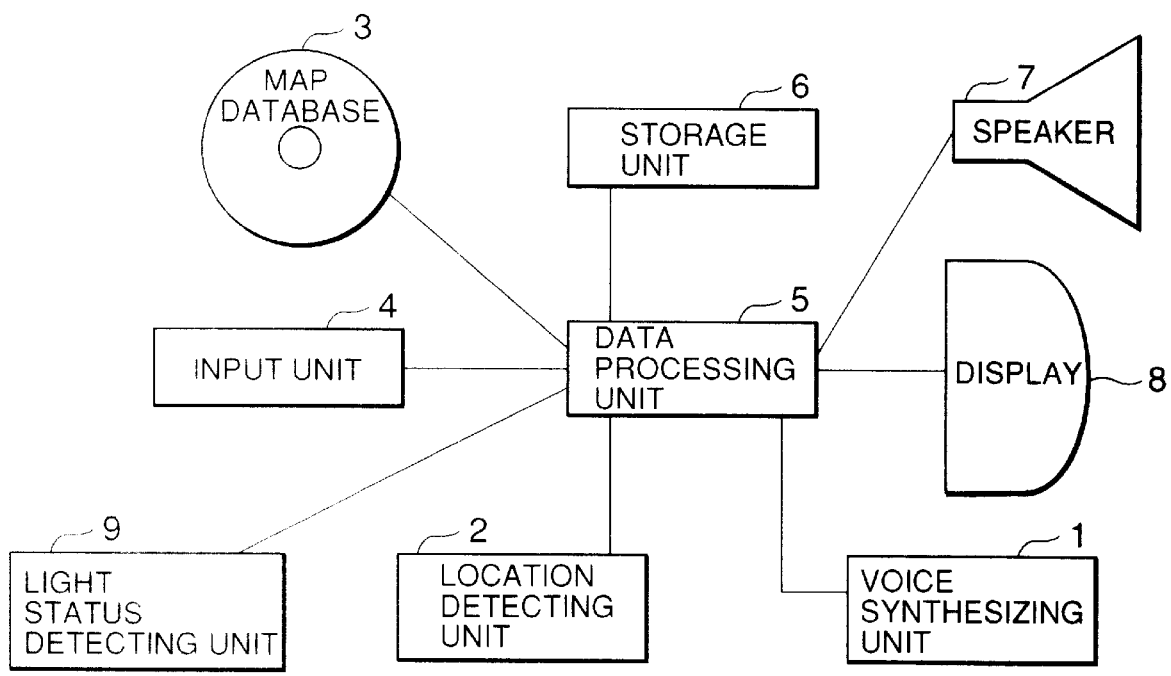
FIG. 1 is a block diagram showing a navigation system.

FIG. 1 shows the configuration of the navigation system used in this embodiment.

As shown in the diagram, the navigation system used in this embodiment, designed for use on a car, comprises an input unit 4 which accepts user's instructions and through which the user performs operation, a map database 3 which is a CD-ROM disc and so forth containing map data, a storage unit 6 which contains various types of information, a location detecting unit 2 which finds a current car location, a speaker 7, a voice synthesizing unit 1 which generates voices through the speaker 7, a display 8 on which a mark indicating a current location and a running direction are superimposed on the map, a light status detecting unit 9 which obtains the status of car illuminations, and a data processing unit 5 which controls those components.

The location detecting unit 2 uses an angular velocity sensor which detects a change in the running direction by detecting the yaw rate of the car, a direction sensor which detects the running direction of the car by detecting the earth's magnetism, a speed sensor which generates pulses at an interval proportional to the rotation of the transmission shaft of the car, and a GPS receiver in order to find the current location of the car. The unit then matches a location read from the map database 3 with the calculated current location to determine the current location which is as accurate as possible.

Processing performed by this navigation system will now be described below.

Figure 2:
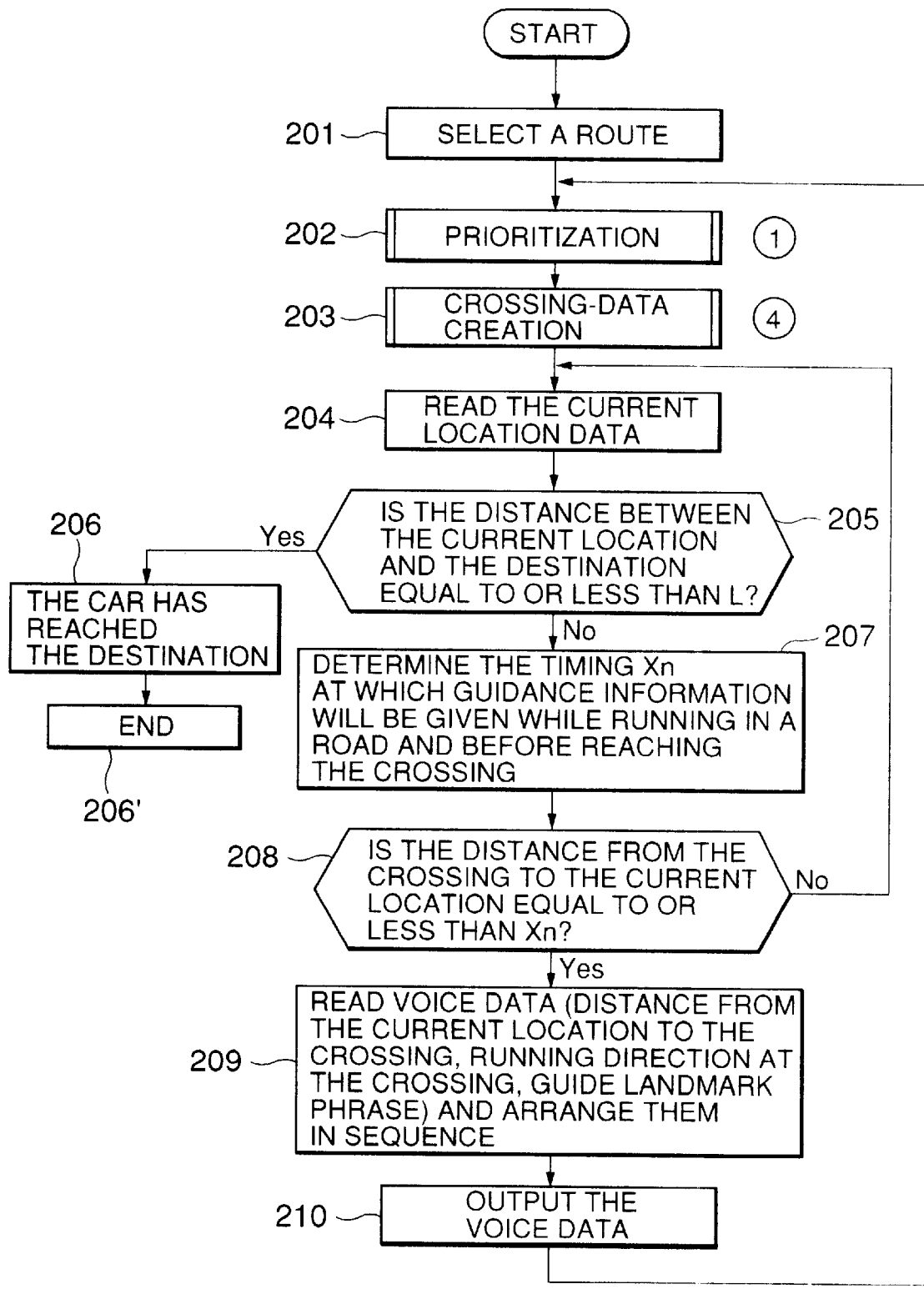
FIG. 2 is a flowchart showing a processing procedure for the navigation system.

FIG. 2 shows a processing procedure for this navigation system.

As shown in the figure, the data processing unit 5 calculates a recommended route from the current location, determined by the location detecting unit 2 or entered by the user via the input unit 4, to a destination entered by the user via the input unit 4, based on map data read from the map database 3 (step 201). To calculate a route, the unit uses, for example, a minimum cost method. In this method, from all the possible routes from the current location to the destination, a route whose sum of the costs of its roads is smallest is selected as a recommended route. The cost of a road is determined according to the following conditions: the longer the road, the higher the cost; the longer the road where a car can run fast, the lower the cost.

Next, the data processing unit 5 performs landmark prioritization (step 202).

Processing performed in step 202 is detailed here.

During this processing, the priority of the landmarks used as a guide at a crossing is determined for each type of landmark.

FIG. 3 shows the details of landmark prioritization performed in step 202.

First, as shown in FIG. 3A, the data processing unit 5 reads data from a landmark data table stored in the storage unit 6 or the map database 3.

The landmark table has a start code column, code range column, priority compensation value column, and nighttime compensation value column for each landmark (such as a building used as a guide) item (type), as shown in FIG. 4. The start code is the smallest ID value of a landmark stored as map data, while the code range is the range of code values that may be given to the landmark as an ID within the map data. For example, for a gas station on row 1, the value in the range of 100 beginning with the start code value 400, from 400 to 500, are map data IDs that can be assigned as gas station IDs. A priority compensation value determines the priority to be used for a landmark, with (priority compensation value−start code value) being a point to determine the priority. Also, a landmark with a larger point has higher priority. The basic priority is determined by (priority compensation value−start code value).

The nighttime compensation value is used to compensate for a point value (priority compensation value−start code value) for use at night; that is, (nighttime compensation value+priority compensation value−start code) is used for a point at night. A nighttime compensation value increases the point of a landmark which does business even during the nighttime such as a gas station and convenience store and, therefore, it is easy to find even at night. This allows a landmark, which is easy to find at night, to be used as a route guide at night according to a processing which will be described later.

In step 302 in FIG. 3A, daytime/nighttime compensation processing is performed. During this processing, the illumination status of the car is obtained via the light status detecting unit 9 (step 304) to check if it is on or off (step 305). If the illumination status is on, (nighttime compensation value+priority compensation value−start code value) is written into the point column of the landmark data table in FIG. 4 (step 306). If the illumination status is off, (priority compensation value−start code value) is written into the point column of the landmark data table in FIG. 4 (step 307).

In step 303 in FIG. 3A, user setting compensation processing of a landmark is performed.

After the daytime/nighttime compensation processing, the system executes the user setting compensation processing as follows. During this processing, the system checks the user setting to see if it has been changed (step 320). The user setting is stored in the storage unit 6 during user specification processing which will be described later. If any of the user setting values has been changed, the system adds a predetermined value (for example, 3000) to the corresponding point column of the landmark data table in FIG. 4 to increase the point to a new point (step 321). If any of the user setting values has been released, the system subtracts the predetermined value (for example 3000) from the corresponding point column of the landmark data table in FIG. 4 to decrease the point to a new point (step 321). Modification of a point in this manner allows the user to use a user-desired landmark as a route guide.

A user specification is entered or released via user specification processing shown in FIG. 3D. This processing is started by a user specification request entered by the user, as necessary, from the input unit 4. As shown in the flowchart, a landmark selection panel shown in FIG. 5 is displayed on the display 8 during the user specification processing (step 308). On this landmark selection screen, the types of landmarks stored in the landmark data table shown in FIG. 4 are arranged in the sequence according to the points at that time. This panel allows the user to specify one or more landmark types through the input unit 4. The data processing unit 5 accepts a user specification entry or a specification release request (steps 311 and 312) until the user selects to end the specification via the input unit 4 (step 309). When the user selects to end the specification, the system stores the setting into the storage unit 6 (step 313).

Upon completion of landmark prioritization processing (step 202), the data processing unit 5 returns control to step 203 in FIG. 2 to perform crossing data creation processing.

FIG. 6 shows the details of this processing.

As shown in FIG. 6A, the system reads the recommended route determined in step 201 in FIG. 2 (step 601) and reads map data including the recommended route from the map database 3 (step 602). The system then compares the recommended route with map data (step 603) to select a crossing at which guidance will be given (step 604). This selection is made for the following types of crossings at the recommended route: a crossing before or after which the running direction of the car must be changed if the car runs along the recommended route, a crossing before or after which the road type is changed, and a crossing at which it is desired that information on the running direction of the car be given because of one of more links (roads) which connect to the crossing. Then, the system determines a change in the running direction of the car before and after the crossing, considering the relationship with the links (roads) connected to the crossing (step 605).

Then, the system determines whether or not a landmark guidance should be given (step 606). During this processing, as shown in FIG. 6B, the system reads selected crossing data from map data that has been read, and determines whether the crossing data includes landmark data (step 611). If the crossing data does not include landmark data at step 611, the system determines that no guidance information will be given at the crossing.

Data on each crossing included in the map data is shown in FIG. 7. As shown in the figure, the data is composed of the crossing ID, the x-y coordinates of the crossing location as well as landmark data such as the number of landmarks at the crossing, the IDs of the landmarks at the crossing, and their x-y coordinates.

For a crossing whose landmark data is included in the crossing data, the system checks if the voice data group stored on the storage unit 6 contains voice data on the landmark of a type included in the landmark data (step 612). If the voice group does not include voice data on the landmark, it is determined that there is no landmark guide for the crossing.

As shown in FIG. 8, the voice data group is composed of guidance voice data on distances and times, guidance voice data on the running direction, guidance voice data on where the car should turn, and guidance voice data on the type of landmark. Voice data indicating a landmark type is associated with the beginning ID of the corresponding landmark type. Therefore, the data processing unit 5 checks each landmark ID contained in the crossing data, and the start code and code range in the landmark table as shown in FIG. 4. to determine whether or not the voice data group includes voice data on the type of a landmark contained in the crossing data.

For a crossing whose landmarks are determined, in step 612, to have voice data in the voice data group, the system checks the x-y coordinates of the crossing to see if at least one of the landmarks having voice data is within a specified distance from the crossing (step 613). If there is such a landmark, the system determines that landmark guidance information should be displayed. Otherwise, the system determines that no landmark guidance information should be displayed.

When landmark guidance display determination processing (606) is terminated in FIG. 6A, the system executes landmark selection processing (step 608) and landmark phrase selection processing (step 609) for a crossing for which landmark guide information is to be displayed (step 607).

As shown in FIG. 6C, when control is passed to the landmark selection processing routine in step 608, the system calculates, for each crossing for which landmark guidance information is to be displayed, the priority of the type of a landmark which has corresponding voice data and which is within a specified distance from the crossing; this priority calculation is performed based on the points in the landmark data table shown in FIG. 4 (step 619). As a result of the calculation, the system selects the highest-priority landmark for use as the landmark to be used in guidance (step 620).

Upon receiving control, the landmark phrase selection processing routine, shown in step 609 in FIG. 6A, checks if the car which passes through a landmark guide crossing on the recommended route will turn at the crossing at an angle larger than a predetermined angle and if, when the car runs upward before entering the crossing, the landmark selected for the crossing in step 620 in FIG. 6C will be below the crossing with respect to the crossing and in the direction in which the car will run after passing through the crossing (step 616). That is, assume that the car runs upward before entering the crossing. In this case, if the landmark is in the lower-right quadrant with respect to the crossing when the car turns right at the crossing or if the landmark is in the lower-left quadrant with respect to the crossing when the car turns left at the crossing, the routine determines that the selected landmark is below the crossing and that it is on the running-direction side after passing through the crossing. Also, if the car turns at the crossing at an angle larger than a predetermined angle (e.g., 35 degrees or larger) and if, when the car runs upward before entering the crossing, the selected landmark is below the crossing with respect to the crossing and in the direction in which the car will run after passing through the crossing, as at location b in FIG. 9 where the car turns around the gas station selected for the landmark, the routine selects the phrase "around corner . . . " as turning-point guidance voice data (step 617). For other locations such as locations c and d in FIG. 9, the routine selects the phrase "at crossing where . . . is located" as turning-point guidance data (step 618).

In the next step 204 in FIG. 2, the system reads the current location determined by the location detecting unit 2 and, in step 205, checks if the distance between the current location and the destination is equal to or smaller than a specified value L. If it is, the system assumes that the car has reached the destination (step 206) and ends processing.

If the distance to the destination is not equal to or smaller than the specified value L, the system finds the next crossing, through which the car will pass, from those crossings determined as landmark guides based on the current location and the recommended route. From the x-y coordinates of this crossing, the system determines the location Xn at which guidance information for this crossing will be given (step 207). The system monitors the current location determined by the location detecting unit 2 and, when the car reaches the location Xn (step 208), joins voice data on the distance from the location Xn to the crossing, voice data on the type of the landmark selected for this crossing, voice data for guiding the selected turning-point of the car at the crossing, and voice data for guiding the running direction corresponding to the change in direction obtained in step 605 (step 209), and outputs the joined voice data from the speaker 7 (step 210).

Figure 9:
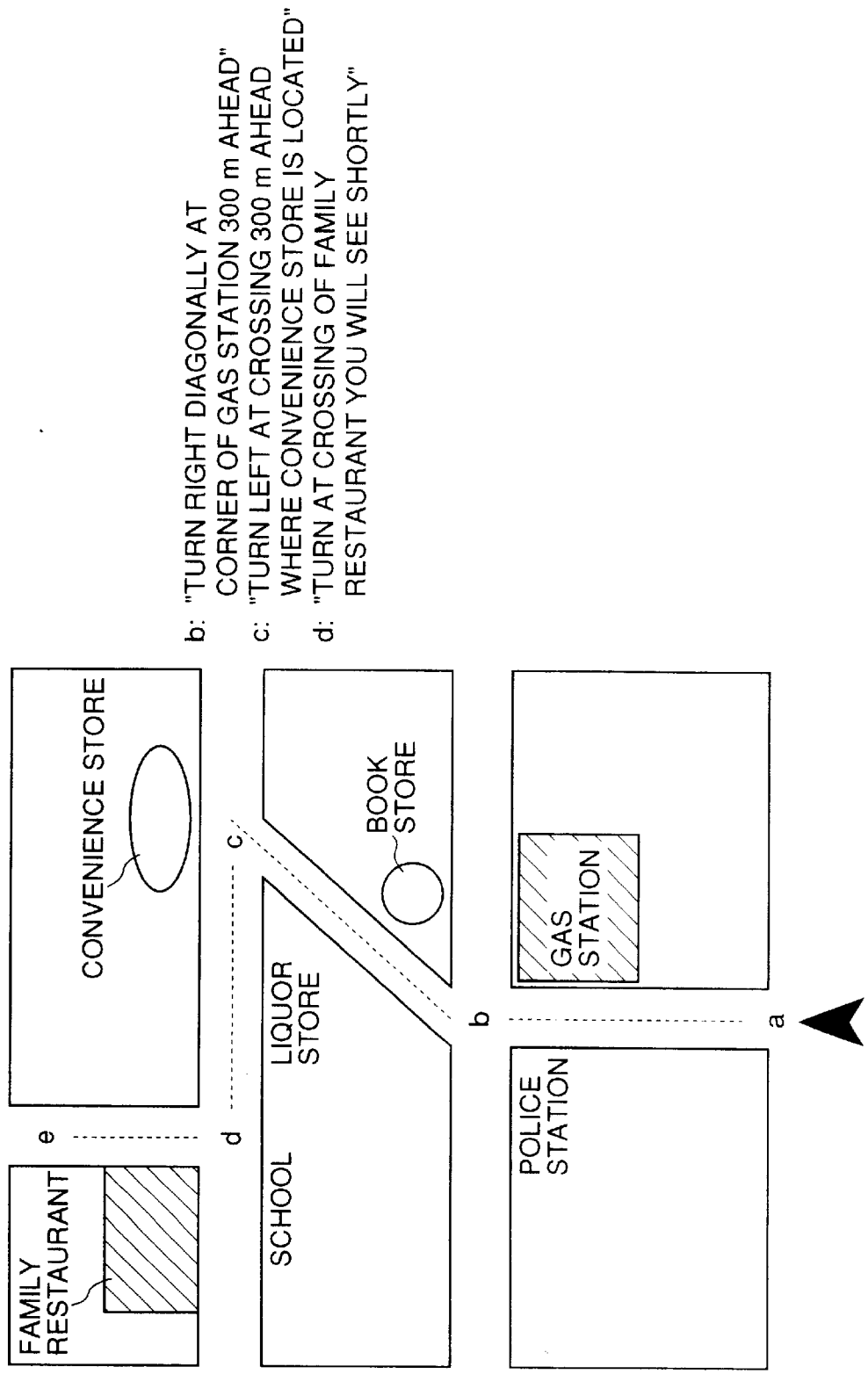
FIG. 9 is a diagram showing how voice guidance is given.

As a result, when the car turns around the gas station selected as a landmark, for example, at location b in FIG. 9, the guidance phrase "Turn right diagonally at corner of gas station 300 m ahead" is used with emphasis on the word "corner"; when the car turns at the crossing not around the convenience store at location c, the guidance phrase "Turn left at crossing 300 m ahead where convenience store is located" is used. Those intuitively-understood guidance phrases are easier to understand even at a crossing where a plurality of roads are crossed in a complicated manner.

When this processing ends, control goes back to step 202 and the processing is repeated.

A navigation system of an embodiment according to the present invention has been described above.

The crossing data shown in FIG. 7 may be configured as shown in FIG. 10A. In this case, the map data is created for each square area (for example, a 10 Km×10 Km area) divided by a mesh, the road map being represented as a network of the links connected to each other via nodes. That is, a road is represented approximately as a combination of a plurality of straight lines (links), and a node as a connection point of two links. A crossing is always a node.

As shown in the figure, crossing data on each crossing in this configuration is composed of the crossing node ID, the x-y coordinates of the crossing location, the number of neighboring nodes of the crossing, neighboring node information, the number of landmarks at the crossing, and information on each landmark at the crossing. Neighboring node information is composed of the ID of each neighboring node and the direction of the mesh for identifying map data including the node information.

Information on each landmark is composed of the ID of the landmark, the x-y coordinates of the landmark, and the landmark visual field condition. The landmark visual field condition indicates whether or not the node can be seen from a neighboring node. As shown in FIG. 10B, the landmark visual condition is composed of 8 bits, each indicating whether or not the landmark can be seen from a node.

Figure 11:
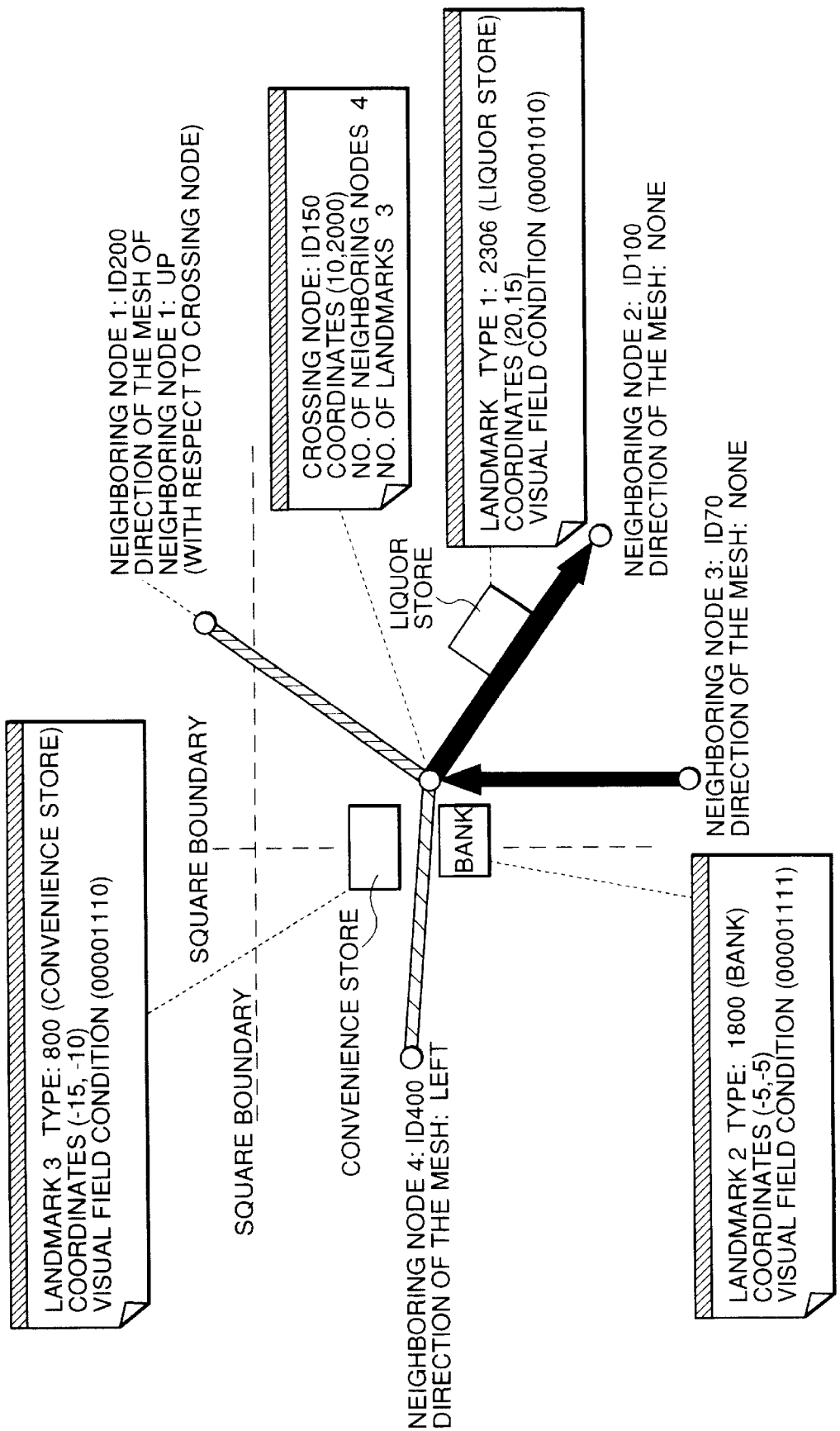
FIG. 11 is a diagram showing typical crossing map data.

FIG. 11 shows the relationship among crossing data, information on the landmarks at the crossing, and the actual map.

In this example, for a crossing ID150, three landmarks 1, 2, and 3, that is, a liquor store, convenience store, and bank, as well as neighboring nodes 1, 2, 3, and 4, are registered. The visual field condition ". . . 1010" is defined for landmark 1. This means that landmark 1, the liquor store, can be seen from neighboring nodes 2 and 4, but not from the neighboring nodes 1 and 3.

Figure 10:
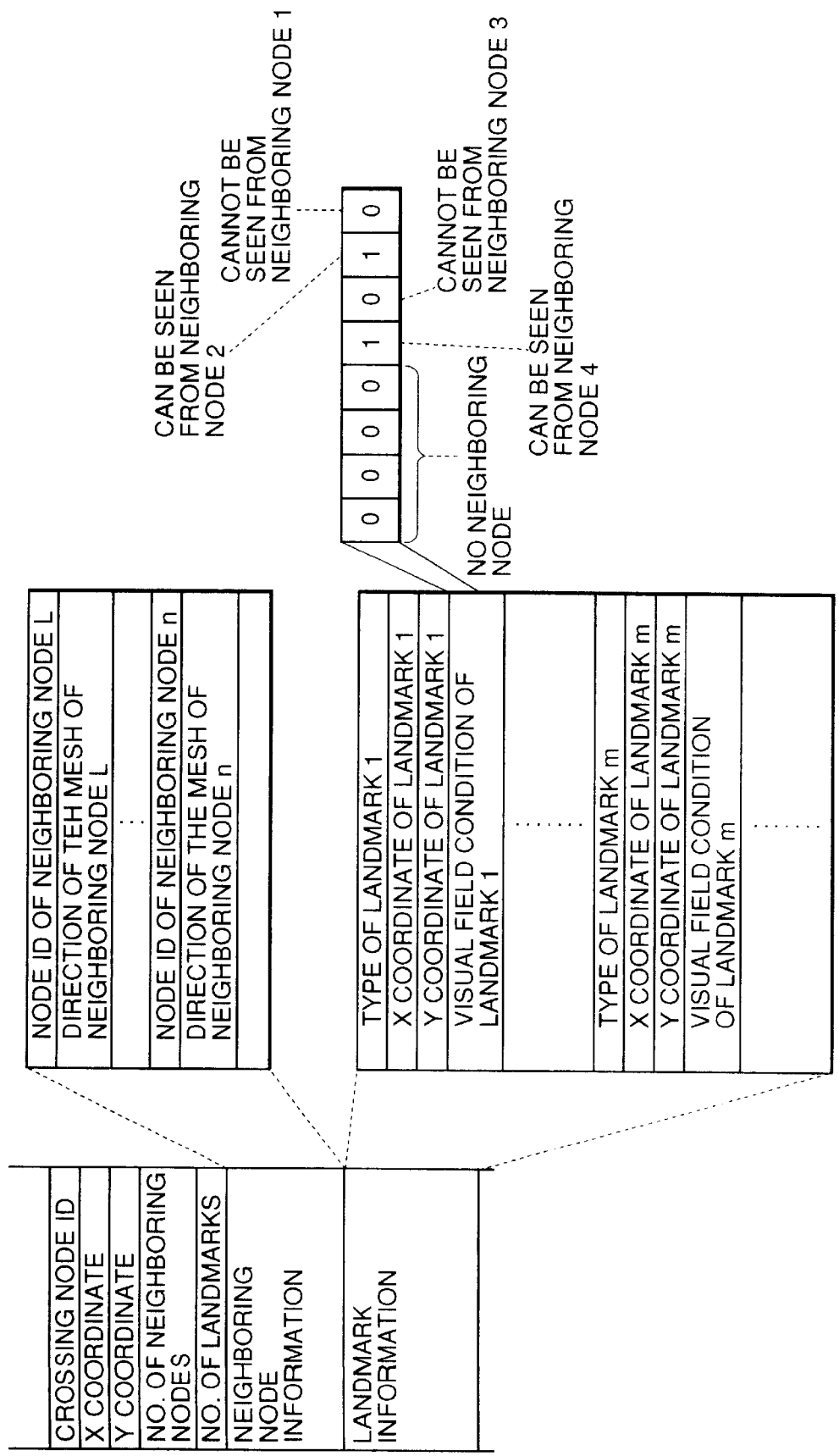
FIG. 10A is a diagram showing the configuration of crossing data.
FIG. 10B is a diagram showing the configuration of crossing data.

At a crossing shown in FIG. 10, this navigation system operates the same way it does in the above example, but it may take the visual field condition into consideration and, for a landmark which cannot be seen from the node immediately before the crossing, the guidance priority may be decreased. More specifically, for a landmark which cannot be seen from the node immediately before the crossing, a fixed value may be subtracted from the point value column of the landmark data table in the prioritization step 202 (flowchart shown in FIG. 3A).

This makes it possible for a landmark, which can be seen before entering the crossing, to be prioritized as a guide.

In the above embodiment, the illumination on/off status of the car is used to determine whether to use the nighttime compensation value. In addition, whether or not the nighttime compensation value should be used may be determined by the time of day indicated by an internal or external clock. If the clock indicates nighttime, the nighttime compensation value may be used. Whether or not the nighttime compensation value should be used may also be determined by the weather condition. That is, when it is cloudy and the visual field condition is bad, the nighttime compensation value may be used.

As described above, the present invention provides a car driver with a navigation system which gives easier-to-understand route guidance information, which makes the driver feel much more capable of finding a direction into which the car should run and a point where the car should turn.

What is claimed is:

1. A navigation system which guides a mobile unit through a route to a destination, comprising:
    a road map database containing road map data and landmark data on landmark candidates at each crossing in a road map expressed by the road map data;
    a landmark table describing priority of each type of landmark candidates expressed by the landmark data;
    landmark selection means for detecting landmark candidates at the crossing where the mobile unit on the route is going to enter based on the road map data and the landmark data, and for selecting a landmark candidate as a landmark from the detected landmark candidates based on the landmark table, wherein said landmark candidate selected as a landmark has the highest-priority type among the detected landmark candidates;
    guidance means for providing guidance information by referencing the selected landmark candidate as a landmark and the route;
    decision means for determining whether a current time is in the daytime or in the nighttime; and
    changing means for changing the priority of each type of the landmark candidates described in said landmark table according to decision of the decision means.

2. The navigation system as claimed in claim 1, wherein said guidance means provides guidance on said route through voices.

3. A navigation system which guides a mobile unit through a route to a destination, comprising:
    a road map database containing road map data, landmark data on landmark candidates at each crossing in a road map expressed by the road map data, and attribution data indicating, whether or not each of said landmark candidates expressed by the landmark data is visible from the mobile unit which is going to enter the crossing where the landmark candidate is located through each of the roads linked to the crossing;
    landmark selection means for detecting landmark candidates at the crossing where the mobile unit on the route is going to enter based on the roadmap data and the landmark data, and for selecting a landmark candidate as a landmark from the landmark candidates thus detected, based on the attribution data corresponding to the landmark candidates, wherein said landmark candidate selected as a landmark is visible from the mobile unit which is going to enter the crossing where the landmark candidates thus detected are located; and
    guidance means for providing guidance information by referencing the candidate selected as a landmark and the route.

4. The A navigation system as claimed in claim 3, wherein said guidance means provides guidance on said route through voices.

5. A navigation system which guides a mobile unit through a route to a destination through voices, comprising:
    voice guidance means the crossing where the mobile unit on the route is going to enter on the basis of the road map data and the data on the plurality of landmarks, for selecting from the detected plurality of landmarks, a landmark belonging to a highest-priority for providing voice guidance information referencing a landmark at a crossing where the mobile unit on the route is going to enter and the route, wherein
    when the route makes a turn at the crossing where the mobile unit is going to enter, said voice guidance means varies a landmark reference mode used in the voice guidance according to a relationship between a location of the landmark and the route.

6. The navigation system as claimed in claim 5, wherein, when the route makes a turn at the crossing where the mobile unit is going to enter, said voice guidance means varies the landmark reference mode used in the voice guidance, in such a manner that the voice guidance has a phrase "around the corner of . . . " when the route turns around the corner of the landmark, and the voice guidance has a phrase "at the crossing where . . . is located" when it is not around the corner of the landmark where the route makes a turn.

7. The navigation system as claimed in claim 5, further comprising:
    a road map database containing road map data and landmark data on landmark candidates at each crossing in a road map expressed by the road map data;
    a landmark table describing priority of each type of landmark candidates expressed by the landmark data; and
    landmark selection means for detecting landmark candidates at the crossing where the mobile unit on the route is going to enter based on the road map data and the landmark data, and for selecting a landmark candidate as a landmark from the detected landmark candidates based on the landmark table, wherein
    said landmark candidate selected as a landmark has the highest-priority type among the detected landmark candidates.

8. The navigation system as claimed in claim 7, further comprising:
    accepting means for accepting an instruction indicating a landmark type and a priority of the landmark type; and
    changing means for changing the priority of each type of the landmark candidates described in said landmark table according to the instruction accepted by said acceptance means.

* * * * *